(12) United States Patent
Kano et al.

(10) Patent No.: US 7,795,161 B2
(45) Date of Patent: Sep. 14, 2010

(54) FABRIC FOR AIRBAGS

(75) Inventors: Kenichiro Kano, Shiga (JP); Takashi Tsuruta, Shiga (JP); Hideo Isoda, Shiga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 12/303,409

(22) PCT Filed: Jun. 5, 2007

(86) PCT No.: PCT/JP2007/061329

§ 371 (c)(1),
(2), (4) Date: Dec. 4, 2008

(87) PCT Pub. No.: WO2007/142214

PCT Pub. Date: Dec. 13, 2007

(65) Prior Publication Data

US 2009/0247030 A1  Oct. 1, 2009

(30) Foreign Application Priority Data

| Jun. 9, 2006 | (JP) | 2006-160819 |
| Jun. 9, 2006 | (JP) | 2006-160820 |
| Mar. 8, 2007 | (JP) | 2007-058022 |
| Mar. 30, 2007 | (JP) | 2007-092323 |

(51) Int. Cl.
*B32B 15/18* (2006.01)

(52) U.S. Cl. .................. 442/76; 442/158; 442/168; 280/728.1; 280/743.1

(58) Field of Classification Search .............. 428/34.3, 428/34.5, 34.6, 34.7, 35.7, 36.1, 36.91; 442/76, 442/158, 168; 280/728.1, 743.1; 383/3
See application file for complete search history.

(56) References Cited

U.S. PATENT DOCUMENTS

| 7,353,669 B2 * | 4/2008 | Ternon et al. ............... 66/192 |
| 7,581,568 B2 * | 9/2009 | Manley ...................... 139/386 |
| 2006/0040577 A1 * | 2/2006 | Schmitt ..................... 442/154 |

FOREIGN PATENT DOCUMENTS

| JP | 04-281062 | 10/1992 |
| JP | 05-016753 | 1/1993 |
| JP | 7-22867 | 4/1995 |
| JP | 7-164988 | 6/1995 |
| JP | 08-192705 | 7/1996 |
| JP | 09-011832 | 1/1997 |
| JP | 11-078747 | 3/1999 |
| JP | 11-222776 | 8/1999 |
| JP | 2000-239971 | 9/2000 |
| JP | 2001-180413 | 7/2001 |
| JP | 2001-524624 | 12/2001 |
| JP | 2002-220780 | 8/2002 |
| JP | 2006-063491 | 3/2006 |
| JP | 2006-291396 | 10/2006 |
| JP | 2007-196993 | 8/2007 |
| WO | WO 99/28121 | 6/1999 |

* cited by examiner

*Primary Examiner*—Arti Singh-Pandey
(74) *Attorney, Agent, or Firm*—Fish & Richardson P.C.

(57) ABSTRACT

A fabric for airbags which comprises a synthetic fiber woven fabric and synthetic thermoplastic resin applied on at least one side of the synthetic fiber woven fabric, characterized in that, by applying the synthetic thermoplastic resin, both edge-comb resistance and tear strength of the synthetic fiber woven fabric become 1.3 times or more as large as respective values of the synthetic fiber woven fabric before applying the synthetic thermoplastic resin. Preferably, the fabric for airbags has low air permeability and self-extinguishing property, and is capable of being repelletized with ease.

14 Claims, 2 Drawing Sheets 2.0 um 2.0 um

FABRIC FOR AIRBAGS

TECHNICAL FIELD

The present invention provides at a low cost a fabric for airbags, one of safety devices for automobiles, in which both edgecomb resistance and tear strength (factors affecting inflating properties of an airbag) are improved. More specifically, the present invention provides a fabric for airbags which is excellent in a human body-restraint performance and is capable of being recycled as easily as an uncoated fabric and a fabric for airbags which has self-extinguishing property and low air permeability.

BACKGROUND ART

An airbag is one of safety devices for automobiles and its installation rate recently increases. When the collision accident of automobile happens, the impact is sensed by a sensor and inflator generates a gas with high temperature and high pressure. This gas inflates the airbag rapidly, whereby preventing and protecting especially human heads from colliding with a steering wheel, a windshield, pane and the like when the body of driver or passenger flies out to the direction of collision.

Conventionally, a coated fabric which is coated with synthetic rubber such as chloroprene, chlorosulfonated olefin, silicone and the like has been used for airbags because they have high heat resistance, high air blocking ability (low air permeability), and high fire retardancy. Currently, silicone coating is mainly used.

However, since the above-mentioned fabrics coated with synthetic rubber are heavy and their flexibility is not satisfactory and, further, their manufacturing costs are high, there are many drawbacks in using them as a fabric for airbags. Their edgecomb resistance is also poor, and therefore improvement is required. In addition, recycling characteristics are bad.

Further, in the above-mentioned fabrics coated with synthetic rubber, especially when an amount of coating is reduced, self-extinguishing property cannot be achieved and therefore improvement is required.

Although it is conventionally known to improve fabric properties by changing an amount of coating (see, for example, JP 5-16753A), there is no description on inflating properties of airbags and the like. In addition, air permeability and fire retardancy are not satisfactory. Therefore, improvement is required.

A method is proposed, which allows recycling a silicone-coated fabric by immersing the fabric into an alkali solution followed by drying and, then, by peeling off the silicone coat layer (see, for example, JP 2001-180413A). However, since a step for peeling off the silicone coating layer is necessary, manufacturing cost increases.

An invention is proposed, in which cross-linked elastomer is coated on a fabric for lightening and cost reduction (see, for example, JP 2001-524624A). However, there is no description on fire retardancy, and then improvement is required. Additionally, it is unpleasant to use cross linked resin because a cross linking process requires some amount of heat, resulting in increase of a manufacturing cost and deterioration of recycling characteristics.

Currently, uncoated fabrics for airbags without coating are mainly used, which are light and excellent in a packing property (see, for example, JP 4-281062A). However, airbags close to passengers, such as side airbags, are required to have a more rapid inflating property and, therefore, a fabric for airbags standing high pressure inflation is required.

An impregnating treatment with a diluted synthetic resin solution is proposed to form a fabric for airbags which have a high edgecomb resistance while maintaining lightness and good packing properties which are characteristics for an uncoated fabric (see, for example, JP 11-222776A). However, tear strength and low air permeability are not satisfactory.

An airbag in which an uncoated fabric and a reinforcing fabric are detachably laminated is proposed (see, for example, JU 7-22867A). However, since the reinforcing fabric is coated with heat resistant coating, it is difficult to recycle them.

Many other means are proposed for an uncoated fabric capable of being recycled (see, for example, JP 8-192705A, JP 9-11832A, JP 11-78747A). However, since an uncoated fabric has high air permeability, they are poor in human body-restraint performance when airbags inflate.

DISCLOSURE OF THE INVENTION

Problem to be Solved by the Invention

The present invention provides at a low cost a fabric for airbags, one of safety devices for automobiles, in which both edgecomb resistance and tear strength (factors affecting inflating properties of an airbag) are improved. This has not been achieved by the prior art. More specifically, the present invention provides a fabric for an airbag which is capable of being recycled as easily as an uncoated fabric, and a fabric for airbags which has self-extinguishing property.

Means for Solving the Problem

The present invention provides:

(1) A fabric for airbags which comprises a synthetic fiber woven fabric and synthetic thermoplastic resin applied on at least one side of the synthetic fiber woven fabric, characterized in that, by applying the synthetic thermoplastic resin, both edgecomb resistance and tear strength of the synthetic fiber woven fabric become 1.3 times or more as large as respective values of the synthetic fiber woven fabric before applying the synthetic thermoplastic resin;

(2) The fabric for airbags according to (1), wherein the synthetic fiber woven fabric has a cover factor of 1500 to 2500, wherein the synthetic thermoplastic resin-applied fabric has air permeability of 1.0 $L/cm^2/min$. or smaller at a pressure difference of 100 kPa, wherein, in a morphological structure of a pellet formed by repelletizing a piece obtained by directly cutting the synthetic thermoplastic resin-applied fabric, the synthetic thermoplastic resin substantially uniformly disperses in a continuous phase of resin derived from the synthetic fiber woven fabric, and wherein the average particle diameter of the synthetic thermoplastic resin in the resin derived from the synthetic fiber woven fabric is 2 μm or smaller;

(3) The fabric for airbags according to (1) or (2), wherein the synthetic thermoplastic resin-applied fabric has air permeability of 0.10 $L/cm^2/min$. or smaller at a pressure difference of 100 kPa, and has self-extinguishing property;

(4) The fabric for airbags according to any one of (1) to (3), wherein an applying amount of the synthetic thermoplastic resin is 0.1 to 15 $g/m^2$ by dry weight;

(5) The fabric for airbags according to any one of (1) to (4), wherein the synthetic thermoplastic resin is at least one type of resin selected from a group consisting of polyurethane resin, acrylic resin, polyester resin and polyamide resin;

(6) The fabric for airbags according to any one of (1) to (5), wherein the synthetic thermoplastic resin is polyamide resin which contains a soft segment having a molecular weight of 100 to 5000 in polymer;

(7) The fabric for airbags according to any one of (1) to (6), wherein a breaking elongation of a film made of the synthetic thermoplastic resin is 300% or larger;

(8) The fabric for airbags according to any one of (1) to (7), wherein the synthetic thermoplastic resin is polyamide resin which contains amide-modified soft segment having a molecular weight of 100 to 5000 in polymer.

EFFECT OF THE INVENTION

The present invention can provide at a low cost a fabric for airbags, one of safety devices for automobiles, in which both edgecomb resistance and tear strength (factors affecting inflating properties of an airbag) are improved. More specifically, the present invention can provide a fabric for airbags which is excellent in human body-restraint performance and is capable of being recycled as easily as an uncoated fabric, and a fabric for airbags which has self-extinguishing property and low air permeability.

BEST MODE FOR CARRYING OUT THE INVENTION

Figure 1:
FIG. 1 is a transmission electron microscope photograph of a cross sectional structure for a pellet obtained by repelletization in Example 1 (magnified by 5000-fold, the scale indicates 2.0 μm).

The present invention will be explained below in detail.

In the present invention, a synthetic fiber is not particularly limited to specified materials, but an aliphatic polyamide fiber such as Nylon 66, Nylon 6, Nylon 46, Nylon 12 and the like; an aromatic polyamide fiber such as an aramid fiber; a polyester fiber such as polyethylene terephthalate, polytrimethylene terephthalate, polybutylene terephthalate and the like are particularly used. In addition to them, a fully aromatic polyester fiber, an ultra high molecular weight polyethylene fiber, a polyparaphenylene benzo-bis-oxazol fiber (a PBO fiber), a polyphenylene sulfide fiber, a polyether keton fiber are also used. However, a polyester fiber and a polyamide fiber are particularly preferred from the economical viewpoint. Additionally, these fibers may be obtained from raw materials, the whole or a part of which is from recycled materials. Further, these fibers may contain a various kinds of additives in order to improve process passage ability in a process for making yarns and a finishing process. For example, these additives include antioxidant, thermal stabilizers, leveling agents, antistatic agents, thickening agents, flame retardants and the like. These synthetic fibers may be mass colored fibers or fibers colored after making. Further, a single fiber may have a cross sectional shape of a usual circle or any other shapes. It is preferable to weave a fabric using synthetic fiber as a multifilament fiber with considering breaking strength, breaking elongation and the like.

In the present invention, a method for making a fabric is not particularly limited, but plain weaving is preferable with considering uniformity in fabric properties. It is not necessary to use the same yarn for warp and weft, and there is no problem when yarns different in thickness, the number of fibers, and a kind of fiber are used. However, it is preferable to use one kind of polymer with considering recycling characteristics.

A loom is not particularly limited, but includes an air jet loom, a rapier loom, a water jet loom and the like.

It is preferable that a cover factor calculated from the following Equation 1 of a fiber woven fabric is 1500 to 2500. It is not preferable that the cover factor is less than 1500 because air permeability increases and slippages on a stitch line in an airbag become big. It is not preferable that the cover factor is more than 2500 because stiffness increases and a packing property deteriorates. More preferable cover factor is 1800 to 2300.

$$\text{Cover Factor} = (\text{warp fineness} \times 0.9)^{1/2} \times (\text{warp density}) + (\text{weft fineness} \times 0.9)^{1/2} \times (\text{weft density}) \quad \text{(Equation 1)}$$

In the Equation 1, warp fineness and weft fineness are expressed in dtex, and warp density and weft density are expressed in fiber/2.54 cm.

The fabric of the present invention may be made by applying thermoplastic synthetic resin on a fabric woven by a known method. Thermosetting silicone resin is known to be used widely as a coating agent for airbags. However, since when the thermosetting silicone resin is used, a sufficient amount of heat is required to cure, resulting in increase of a manufacturing cost. Therefore, in the present invention, it is preferable to use thermoplastic resin.

A method of applying is not particularly limited, but known methods may be used. It is preferable to use a knife coating process with considering a manufacturing cost and flexibility of obtained fabric.

In the present invention, as thermoplastic synthetic resin to be applied to fabric, polyurethane resin, acrylic resin and polyamide resin may be used, and it is preferable to use polyamide resin containing a soft segment having a molecular weight of 100 to 5000 from a viewpoint of dispersibility in repelletization. More preferably, the molecular weight of the soft segment is 300 to 3000. It is not preferable that the molecular weight is less than 100 because flexibility of a base fabric after applying reduces and tear strength is liable to decrease. It is not preferable that the molecular weight is more than 5000 because edgecomb resistance is liable to be insufficient and fire retardancy deteriorates.

In this text, as a soft segment, all kind of polyol may be used. Particularly, amino-modified linear polyalkylene glycol is preferable from a viewpoint of dispersity of thermoplastic resin in repelletization. More preferable ones are amino-modified polyethylene glycol, polypropylene glycol, polytetramethylene glycol or polybutylene glycol.

It is preferable that a content of the soft segment is 25 to 50 by a molar ratio based on polyamide resin in polymer. When the content is less than 25%, flexibility of a fabric after applying rein reduces and air permeability increases. It is not preferable that the content exceeds 50% because fire retardancy deteriorates.

In addition, additives such as an anti-degradation agent, an inorganic filler, a coloring agent and the like may be added to the thermoplastic resin as far as they do not affect target properties.

In the present invention, it is preferable that air permeability of a fabric on which thermoplastic resin is applied at a pressure difference of 100 kPa is 1.0 L/cm$^2$/min. or smaller. When a fabric is evaluated in standard conditions, although airbags are usually subjected to a pressure of 30 to 50 kPa at a time of inflating, it is appropriate that air permeability is measured at a pressure difference of 100 kPa because a thermal effect from inflator gunpowder should be further considered.

The air permeability at a pressure difference of 100 kPa is preferably 0.5 L/cm$^2$/min. or smaller, more preferably 0.1 L/cm$^2$/min. or smaller, further preferably 0.05 L/cm$^2$/min. or smaller, most preferably 0.02 L/cm$^2$/min. or smaller.

It is not preferable that the air permeability at a pressure difference of 100 kPa is more than 1.0 L/cm$^2$/min. because the obtained airbags do not satisfy passenger-restraint performance. For example, by making the elongation of a film made of resin to be applied as high as 300% or more, air permeability of 1.0 L/cm$^2$/min. or smaller can be achieved.

It is preferable that the elongation of the film made of resin to be applied is high, and the upper limit is not specifically defined, but the upper limit may be 2000% or smaller.

Additionally, it is preferable that air permeability defined in JIS-L1096 is less than 0.1 cc/cm$^2$/sec.

In the fabric for airbags according to the present invention which comprises a synthetic fiber woven fabric and synthetic thermoplastic resin applied on at least one side of the synthetic fiber woven fabric, it is preferable that, by applying the synthetic thermoplastic resin, both edgecomb resistance and tear strength of the synthetic fiber woven fabric become 1.3 times or more as large as respective values of the synthetic fiber woven fabric before applying the synthetic thermoplastic resin. This magnification is preferably 1.4 times or more, more preferably 1.5 times or more. The upper limit is not specifically defined, but it is preferably 5.0 times or less, more preferably 3.0 times or less with considering post processes such as sewing for a usual base fabric.

According to known methods, when resin decreasing frictional resistance between fibers is used, tear strength increases but edgecomb resistance decreases, while when resin increasing frictional resistance between fibers is used, edgecomb resistance increases but tear strength decreases. Therefore, in the obtained airbag, when the resin decreasing frictional resistance is used, thermal exchange occurs between a high temperature gas generated from an inflator and the exterior at places where slippages on a stitch line in the airbag become big due to decreased edgecomb resistance, resulting in a burst.

On the other hand, when the resin increasing frictional resistance is used, since tear strength is low, fractures run even from slight slippages, resulting in a burst.

In the present invention, the present inventors have made efforts to solve the above problems, and have found that in a fabric comprising a synthetic fiber woven fabric and synthetic thermoplastic resin applied on at least one side of the synthetic fiber woven fabric, by applying the synthetic thermoplastic resin to make both edgecomb resistance and tear strength 1.3 times or more as large as respective values of the synthetic fiber woven fabric before applying the synthetic thermoplastic resin, adequate airbags which do not cause a burst even in using a high pressure inflator can be achieved.

In the present invention, it is preferable that flammability test evaluated according to a test method defined in Federal Motor Vehicle Safety Standards (FMVSS) No. 302 (Horizontal Flame Test) is self-extinguishing.

In this text, self-extinguishing property is one of categories defined in JIS-D1201, in which a test piece, whose combustion goes out before reaching a marked line A or goes out within 50 mm traveling and within 60 seconds, is treated as that having self-extinguishing property.

Fire retardancy is one of the most basic characteristics required for airbag base fabrics, and it is extremely preferable that this characteristic is evaluated as self-extinguishing from a viewpoint of safety. In self-extinguishing property, it is more preferable that combustion goes out before reaching a marked line A.

In the present invention, a dry weight of the thermoplastic synthetic resin is preferably 0.1 to 15 g/m$^2$, more preferably 1.0 to 10 g/m$^2$, further preferably 1.0 to 5.0 g/m$^2$.

The dry weight is calculated by subtracting a weight of an airbag fabric before applying resin measured according to JIS L1096 8.4.2 from a weight of the airbag fabric after applying the resin and drying the resin measured according to JIS L1096 8.4.2.

It is not preferable that a dry weight is 0.1 g/m$^2$ or smaller because it becomes difficult to achieve low air permeability. It is not preferable that a dry weight is 15 g/m$^2$ or larger because flexibility of a fabric is liable to reduce and a manufacturing cost increases.

Additionally, in the present invention, a fabric before applying resin means a fabric just before applying resin and after accomplishing any other processes prior to applying resin, and usually in many cases, it means a fabric wherein shrinking by heat and thermal setting and the like have been conducted.

In the present invention, it is preferable that in a morphological structure (a surface structure in a cross sectional view) of a pellet formed by repelletizing a piece obtained by directly cutting a fabric which comprises a synthetic fiber woven fabric and synthetic thermoplastic resin applied on at least one side of the synthetic fiber woven fabric, the synthetic thermoplastic resin substantially uniformly disperses in a continuous phase, which corresponds to a sea of the islands-in-a-sea structure, of resin derived from the synthetic fiber woven fabric.

In this text a term "uniformly disperse" means a case where the thermoplastic synthetic resin independently exists in the continuous phase and the average particle diameter of the dispersing resin is 2 μm or smaller, more preferably 5 μm or smaller.

As a method of uniform dispersion, for example, there is a method wherein thermoplastic resin is used and its amount to be used is 15 g/m$^2$ or less to improve dispersibility. When products made by repelletization have such a morphological structure, they satisfy strength, stiffness, elongation and impact resistance at the same time and there are a variety of applications.

As a method for recycling, a method of using collected fabrics as they are or after cutting for cushioning, a method of remaking collected fabrics into fibers, plastics and the like after re-melting and re-solving the collected fabrics to make pellets, a so-called chemical method of reusing collected fabrics by depolymerizing the collected fabrics into monomers are included.

The method of recycling according to the present invention is a material recycling method in which collected fabrics are remade into fibers, plastics and the like after re-melting and re-solving the collected fabrics to make pellets from the view point of general-purpose properties and cost. In the present invention, a fabric comprising a synthetic resin applied thereon may be subjected to re-melting or re-solving as it is and may be subjected to remaking.

EXAMPLES

The present invention will be explained further by referring to the following Examples. Additionally, evaluation methods in the Examples were carried out according to the following procedures.

(Tear Strength)

Tear strength was measured according to JIS L1096 8.15.2 (median peak load).

Increase rate of tear strength was calculated from Equation 2.

Increase Rate of Tear Strength (time)=(warp tear strength after resin application+weft tear strength after resin application)/(warp tear strength before resin application+weft tear strength before resin application)     (Equation 2)

(Edgecomb Resistance)

Edgecomb resistance was measured according to ASTM D6479.

Increase rate of edgecomb resistance was calculated from Equation 3.

Increase Rate of Edgecomb Resistance (time)=(warp edgecomb resistance after resin application+weft edgecomb resistance after resin application)/(warp edgecomb resistance before resin application+weft edgecomb resistance before resin application)     (Equation 3)

(Flammability Test)

Flammability test was evaluated according to a test method defined in FMVSS No. 302 (Horizontal Flame Test).

Fire retardancy was categorized according to JIS-D1201.

(Air Permeability)

Air permeability at a pressure difference of 100 kPa was measured using a high pressure air permeability tester manufactured by OEM System Co., Ltd. In addition, air permeability at a pressure difference of 125 kPa was also measured on a Frazier type air permeability tester according to JIS L1096.

(Elongation for Resin Film)

Thermoplastic synthetic resin films having a uniform thickness of 0.3 mm were prepared and elongations at break for the films were measured by a pull test at a chuck distance of 35 mm and at a speed of 300 mm/min.

(Morphological Structure)

A fabric was cut into 5 mm square pieces, these pieces were melted at 270° C., and then the melt was repelletized by extruding from a PCM30 Extruder (L/D=25) manufactured by Ikegai Corp. to obtain pellets.

These pellets were observed by a transmission electron microscope (JEM2010) manufactured by JEOL Ltd. and an optical microscope (a differential interference contrast microscope) manufactured by Nikon Corporation. In the TEM observation, specimens were prepared by slicing the pellets very thin at a right angle with respect to the direction of resin flow and dyed with ruthenium tetraoxide for 30 minutes.

(Physical Properties of Pellet)

Pellets prepared by repelletization were dried in a vacuum dryer at 80° C. for 16 hours, and then the pellets were injection-molded into test pieces.

Physical properties of products were measured by using the obtained test pieces.

| | |
|---|---|
| Tensile strength and tensile elongation | ASTM D638 |
| Flexural strength and Flexural modulus | ASTM D790 |
| Izod impact strength (notched) | ASTM D256 |

Example 1

A polyamide 66 fiber having an overall fineness of 350 dtex and consisting of 108 filaments was plain woven with a water jet loom to a fabric, the fabric was shrunk in boiling water, and then dried at 110° C. to obtain a fabric having a warp density of 63 fibers/2.54 cm and a weft density of 61 fibers/2.54 cm.

Polymer was prepared by mixing polyamide 6, a polyethylene glycol-propyl amine adduct (molecular weight 600) and adipic acid at a molar ratio of 2.5:1:1 as water soluble resin having a solid content of 15%. The viscosity of the water soluble resin was adjusted to 10 dPa·s (measured by a viscotester VT-04F manufactured by Rion Co., Ltd.) by adding 1 wt % of carboxymethyl cellulose based on the water soluble resin.

This water soluble resin was knife coated on the above-prepared fabric at a dried resin amount of 3 g/m$^2$.

Physical properties of the fabric were evaluated and evaluation results are summarized in Table 1.

Example 2

A polyamide 66 fiber having an overall fineness of 350 dtex and consisting of 108 filaments was plain woven with a water jet loom to a fabric, the fabric was shrunk in boiling water, and then dried at 110° C. to obtain a fabric having a warp density of 59 fibers/2.54 cm and a weft density of 59 fibers/2.54 cm.

Polymer was prepared by mixing polyamide 6, a polyethylene glycol-propyl amine adduct (molecular weight 1500) and adipic acid at a molar ratio of 2.5:1:1 as water soluble resin having a solid content of 15%. The viscosity of the water soluble resin was adjusted to 8 dPa·s by adding 1 wt % of carboxymethyl cellulose based on the water soluble resin.

This water soluble resin was knife coated on the above-prepared fabric at a dried resin amount of 7 g/m$^2$.

Physical properties of the fabric were evaluated and evaluation results are summarized in Table 1.

Example 3

A polyamide 66 fiber having an overall fineness of 350 dtex and consisting of 108 filaments was plain woven with a water jet loom to a fabric, the fabric was shrunk in boiling water, and then dried at 110° C. to obtain a fabric having a warp density of 59 fibers/2.54 cm and a weft density of 59 fibers/2.54 cm.

Polymer was prepared by mixing polyamide 6, a polyethylene glycol-propyl amine adduct (molecular weight 600) and adipic acid at a molar ratio of 2.5:1:1 as water soluble resin having a solid content of 10% (viscosity 0.5 dPa·s). This water soluble resin was impregnated into the above-prepared fabric at a dried resin amount of 7 g/m².

Physical properties of the fabric were evaluated and evaluation results are summarized in Table 1.

Example 4

A fabric was prepared according to Example 1, except that a polyamide 66 fiber having an overall fineness of 470 dtex and consisting of 72 filaments was used, that a warp density was 46 fibers/2.54 cm and a weft density was 46 fibers/2.54 cm, and that a resin amount was different.

Physical properties of the fabric were evaluated and evaluation results are summarized in Table 1.

Example 5

A fabric was prepared according to Example 4, except that a warp density was 54 fibers/2.54 cm and a weft density was 54 fibers/2.54 cm, and that a resin amount was different.

Physical properties of the fabric were evaluated and evaluation results are summarized in Table 1.

Comparative Example 1

A polyamide 66 fiber having an overall fineness of 350 dtex and consisting of 108 filaments was plain woven with a water jet loom to a fabric, the fabric was shrunk in boiling water and then dried at 110° C. to obtain a fabric having a warp density of 59 fibers/2.54 cm and a weft density of 59 fibers/2.54 cm.

Physical properties of the fabric were evaluated and evaluation results are summarized in Table 1.

Comparative Example 2

A polyamide 66 fiber having an overall fineness of 350 dtex and consisting of 108 filaments was plain woven with a water jet loom to a fabric, the fabric was shrunk in boiling water, and then dried at 110° C. to obtain a fabric having a warp density of 59 fibers/2.54 cm and a weft density of 59 fibers/2.54 cm.

Solvent-free silicone resin (viscosity 300 dPa·s) was knife coated on the above-prepared fabric at a dried resin amount of 25 g/m².

Physical properties of the fabric were evaluated and evaluation results are summarized in Table 1.

Comparative Example 3

A polyamide 66 fiber having an overall fineness of 350 dtex and consisting of 108 filaments was plain woven with a water jet loom to a fabric, the fabric was shrunk in boiling water, and then dried at 110° C. to obtain a fabric having a warp density of 59 fibers/2.54 cm and a weft density of 59 fibers/2.54 cm.

Copolymer of polyamide 6 and polyamide 66 was prepared as water soluble resin having a solid content of 25% (viscosity 10 dPa·s). This water soluble resin was knife coated on the above-prepared fabric at a dried resin amount of 4 g/m².

Physical properties of the fabric were evaluated and evaluation results are summarized in Table 1.

TABLE 1

| | Unit | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|
| Overall Fineness | dtex | 350 | 350 | 350 | 470 | 470 | 350 | 350 | 350 |
| Number of Filaments | number | 108 | 108 | 108 | 72 | 72 | 108 | 108 | 108 |
| Density   warp | fiber/2.54 cm | 63 | 59 | 59 | 46 | 54 | 59 | 59 | 59 |
|               weft | fiber/2.54 cm | 61 | 59 | 59 | 46 | 54 | 59 | 59 | 59 |
| Cover Factor | — | 2201 | 2094 | 2094 | 1892 | 2221 | 2094 | 2094 | 2094 |
| Amount of Resin | g/m² | 3 | 7 | 7 | 4 | 6 | — | 25 | 4 |
| Elongation of Resin Film | % | 450 | 500 | 450 | 450 | 450 | — | 200 | — |
| Recycling Characteristics | — | GOOD | GOOD | GOOD | GOOD | GOOD | GOOD | POOR | — |
| Flammability Test* | — | S.E. | S.E. | S.E. | S.E. | S.E. | S.E. | S.B. | E.B. |
| Increase Rate of Edgecomb Resistance | time | 1.72 | 1.41 | 2.11 | 1.75 | 1.69 | — | 0.90 | 1.82 |
| Increase Rate of Tear Strength | time | 1.58 | 1.73 | 1.44 | 1.32 | 1.56 | — | 1.25 | 0.52 |
| Air Permeability at 100 kPa | L/cm²/min | 0.05 | 0.02 | 0.04 | 0.68 | 0.01 | 4.5 | 0.00 | 0.84 |
| Air Permeability at 125 kPa | cc/cm²/sec | 0.0 | 0.0 | 0.0 | 0.0 | 0.0 | 0.1 | 0.0 | 0.1 |

*S.E.: Self-extinguishing
S.B.: Slow-burning
E.B.: Easy-burning

In this table, a term "self-extinguishing" indicates the case where combustion goes out before reaching a marked line A.

Morphology observations on pellets obtained by repelletizing the fabrics in Examples 1 to 5 revealed that the thermoplastic resin was dispersed in a continuous phase of polyamide 66 as fine particles having a particle diameter of 0.1 to 1.0 μm.

As a representative example, a photograph of the pellet repelletized from the fabric in Example 1 is shown in FIG. 1. This photograph demonstrates substantially uniform dispersion of Nylon 6 resin.

Figure 2:
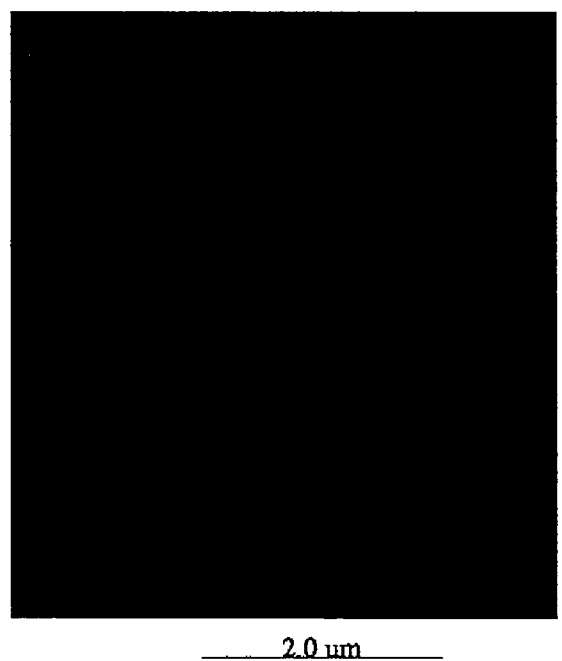
FIG. 2 is a transmission electron microscope photograph of a cross sectional structure for a pellet obtained by repelletization in Comparative Example 1 (magnified by 5000-fold, the scale indicates 2.0 μm).

The product obtained from the fabric in Example 1 showed strength, stiffness elongation and impact resistance equivalent to those of the product obtained from the uncoated fabric in Comparative Example 1 as shown in FIG. 2.

Figure 3:
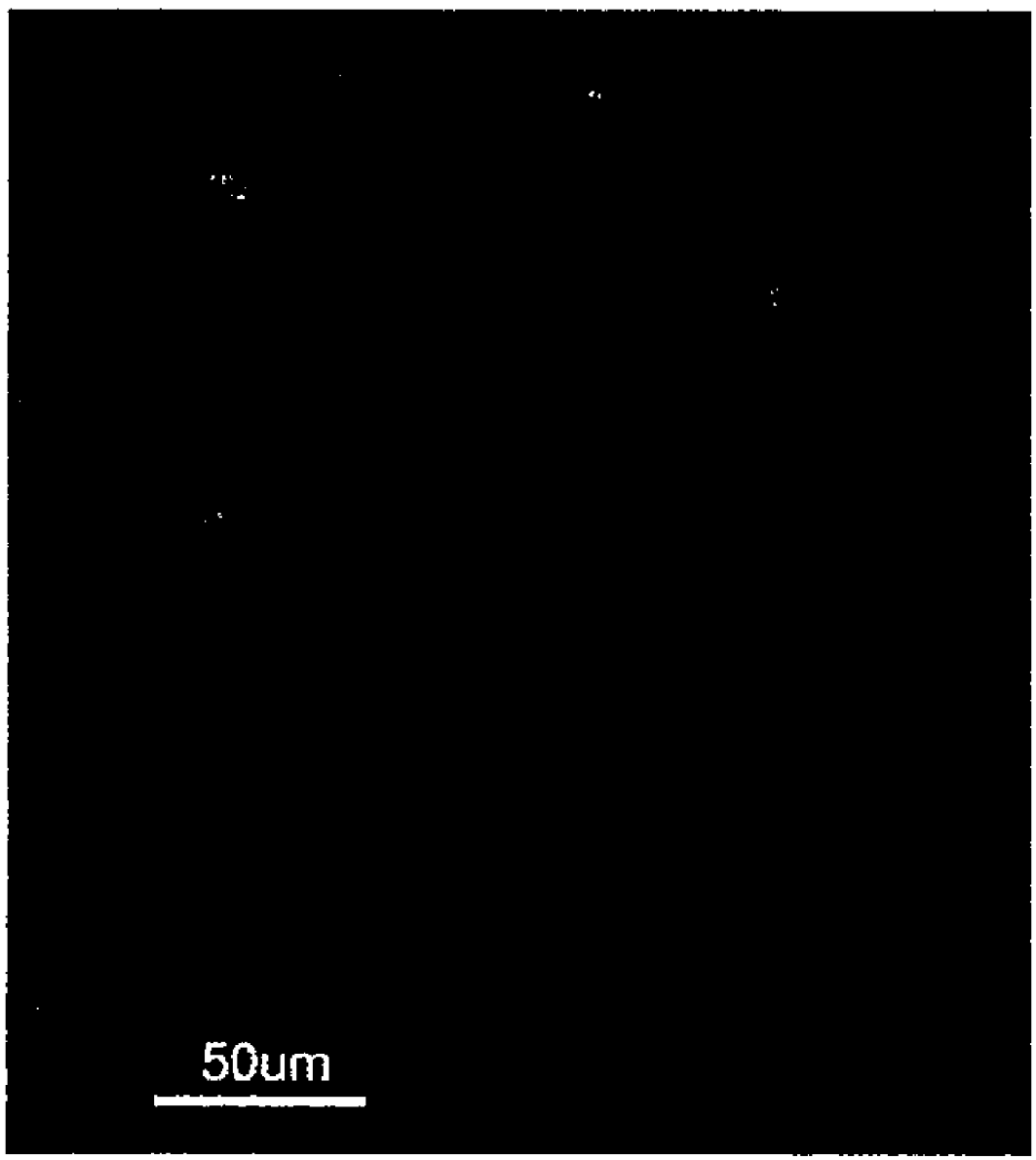
FIG. 3 is an optical microscope photograph of a cross sectional structure for pellet obtained by a repelletization in Comparative Example 2 (magnified by 40-fold the scale indicates 50 μm).

A morphology observation on a pellet obtained by repelletizing the fabric in Comparative Example 2, as shown in FIG. 3, revealed that a major part of the silicone resin formed aggregates having a size of 10 μm to 50 μm or larger and the resin did not uniformly disperse. The product showed poor physical properties, especially elongation and flexural strength.

Physical properties for products obtained in Example 1 and Comparative Examples 1 and 2 are summarized in Table 2.

TABLE 2

|  | Unit | Ex. 1 | Comp. Ex. 1 | Comp. Ex. 2 |
| --- | --- | --- | --- | --- |
| Tensile Strength | MPa | 77 | 80 | 58 |
| Tensile Elongation | % | >30 | >30 | 2.8 |
| Flexural Modulus | GPa | 2.7 | 2.9 | 2.4 |
| Flexural Strength | MPa | 109 | 116 | 84 |
| Izod Impact Strength | J/m | 62 | 61 | 57 |
| Elongation of Resin Film | % | 450 | — | 200 |
| Air Permeability at 100 kPa | L/cm$^2$/min. | 0.05 | 4.5 | 0.00 |

From Examples 1 to 5 and Comparative Examples 1 to 3, it is obvious that the present invention can provide a fabric for airbags, one of safety devices for automobiles in which both edgecomb resistance and tear strength (factors affecting inflating properties of an airbag) are improved. In addition, according to the present invention, a fabric for airbags, one of safety devices for automobiles, can be provided, in which a human body-restraint performance is improved and is capable of being recycled as easily as an uncoated fabric. A fabric for airbags having self-extinguishing property can be provided.

INDUSTRIAL APPLICABILITY

The fabric for airbags according to the present invention may be used at a low cost for airbags, one of safety devices for automobiles, which are excellent in an inflating performance, recycling characteristics and fire retardancy, and therefore it should greatly contribute to the industry.

What is claimed is:

1. A fabric for airbags which comprises a synthetic fiber woven fabric and synthetic thermoplastic resin applied on at least one side of the synthetic fiber woven fabric, wherein the synthetic thermoplastic resin is polyamide resin which contains a soft segment having a molecular weight of 100 to 5000 in polymer, and in that by applying the synthetic thermoplastic resin, both edgecomb resistance and tear strength of the synthetic fiber woven fabric become 1.3 times or more as large as respective values of the synthetic fiber woven fabric before applying the synthetic thermoplastic resin.

2. The fabric for airbags according to claim 1, wherein the synthetic fiber woven fabric has a cover factor of 1500 to 2500, wherein the synthetic thermoplastic resin-applied fabric has air permeability of 1.0 L/cm2/min. or smaller at a pressure difference of 100 kPa, wherein, in a morphological structure of a pellet formed by repelletizing a piece obtained by directly cutting the synthetic thermoplastic resin-applied fabric, the synthetic thermoplastic resin substantially uniformly disperses in a continuous phase of resin derived from the synthetic fiber woven fabric, and wherein the average particle diameter of the synthetic thermoplastic resin in the resin derived from the synthetic fiber woven fabric is 2 μm or smaller.

3. The fabric for airbags according to claim 1 or 2, wherein the synthetic thermoplastic resin-applied fabric has air permeability of 0.10 L/cm2/min. or smaller at a pressure difference of 100 kPa, and has self-extinguishing property.

4. The fabric for airbags according to claim 1, wherein an applying amount of the synthetic thermoplastic resin is 0.1 to 15 g/m2 by dry weight.

5. The fabric for airbags according to claim 1, wherein the synthetic thermoplastic resin is at least one type of resin selected from a group consisting of polyurethane resin, acrylic resin, polyester resin and polyamide resin.

6. The fabric for airbags according to claim 1, wherein a breaking elongation of a film made of the synthetic thermoplastic resin is 300% or larger.

7. The fabric for airbags according to claim 1, wherein the synthetic thermoplastic resin is polyamide resin which contains amide-modified soft segment having a molecular weight of 100 to 5000 in polymer.

8. A fabric for airbags which comprises a synthetic fiber woven fabric and synthetic thermoplastic resin applied on at least one side of the synthetic fiber woven fabric, wherein the synthetic thermoplastic resin is polyamide resin which contains a soft segment having a molecular weight of 100 to 5000 in polymer.

9. The fabric for airbags according to claim 8, wherein, by applying the synthetic thermoplastic resin, both edgecomb resistance and tear strength of the synthetic fiber woven fabric become 1.3 times or more as large as respective values of the synthetic fiber woven fabric before applying the synthetic thermoplastic resin.

10. The fabric for airbags according to claim 8, wherein the synthetic fiber woven fabric has a cover factor of 1500 to 2500, wherein the synthetic thermoplastic resin-applied fabric has air permeability of 1.0 L/cm$^2$/min. or smaller at a pressure difference of 100 kPa, wherein, in a morphological structure of a pellet formed by repelletizing a piece obtained by directly cutting the synthetic thermoplastic resin-applied fabric, the synthetic thermoplastic resin substantially uniformly disperses in a continuous phase of resin derived from the synthetic fiber woven fabric, and wherein the average particle diameter of the synthetic thermoplastic resin in the resin derived from the synthetic fiber woven fabric is 2 μm or smaller.

11. The fabric for airbags according to claim 8, wherein the synthetic thermoplastic resin-applied fabric has air permeability of 0.10 L/cm$^2$/min. or smaller at a pressure difference of 100 kPa, and has self-extinguishing property.

12. The fabric for airbags according to claim 8, wherein the amount of synthetic thermoplastic resin applied is 0.1 to 15 g/m$^2$ by dry weight.

13. The fabric for airbags according to claim 8, wherein a breaking elongation of a film made of the synthetic thermoplastic resin is 300% or larger.

14. The fabric for airbags according to claim 8, wherein the synthetic thermoplastic resin is polyamide resin which contains amide-modified soft segment having a molecular weight of 100 to 5000 in polymer.

\* \* \* \* \*